US011994391B2

United States Patent
van der Meijden et al.

(10) Patent No.: US 11,994,391 B2
(45) Date of Patent: May 28, 2024

(54) DETERMINING CHARACTERISTICS OF LIQUID-CONTAINING VESSELS SUCH AS SWIMMING POOLS AND SPAS AND USING SUCH CHARACTERISTICS IN OPERATION OF THE VESSELS

(71) Applicant: ZODIAC POOL SYSTEMS LLC, Vista, CA (US)

(72) Inventors: Hendrikus Johannes van der Meijden, Midrand (ZA); E. Keith McQueen, Vista, CA (US); Phillip Newman, Howic (ZA); Richard E. Mills, Vista, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 261 days.

(21) Appl. No.: 16/140,804

(22) Filed: Sep. 25, 2018

(65) Prior Publication Data

US 2019/0101394 A1    Apr. 4, 2019

Related U.S. Application Data

(60) Provisional application No. 62/693,565, filed on Jul. 3, 2018, provisional application No. 62/568,045, filed on Oct. 4, 2017.

(51) Int. Cl.
*E04H 4/16* (2006.01)
*G01C 21/00* (2006.01)
*G05D 1/00* (2006.01)

(52) U.S. Cl.
CPC ......... *G01C 21/005* (2013.01); *E04H 4/1654* (2013.01); *G05D 1/0044* (2013.01); *G05D 1/0088* (2013.01)

(58) Field of Classification Search
CPC .. G01C 21/005; G05D 1/0044; G05D 1/0088; G05D 2201/0203; E04H 4/1654
See application file for complete search history.

(56) References Cited

U.S. PATENT DOCUMENTS 10,209,719 B2 *  2/2019  Hadari ................. E04H 4/1654
10,825,319 B1 *  11/2020  Madden ................ G06T 7/0002
(Continued)

FOREIGN PATENT DOCUMENTS

CN       101139007           3/2008
CN       106441253 B  *    12/2018
(Continued)

OTHER PUBLICATIONS

VisTech. Projects, "LaserDistanceMeter" (YouTube video), uploaded on Sep. 26, 2012 by user "VisTech.Projects," retrieved from Internet on Feb. 18, 2020: <https://www.youtube.com/watch?v=kUaMAHTiJLI> (Year: 2012).*

(Continued)

*Primary Examiner* — Hunter B Lonsberry
*Assistant Examiner* — Daniel M. Robert
(74) *Attorney, Agent, or Firm* — Kilpatrick Townsend & Stockton LLP

(57) ABSTRACT

Augmented (virtual) reality techniques are described for assisting in determining characteristics of swimming pools and spas. Such pools and spas may, for example, be mapped at least as to their general sizes and shapes. The mapped and other information may be available for display and may be furnished to an automatic swimming pool cleaner (APC) to improve its operational efficiency in cleaning the pool.

9 Claims, 5 Drawing Sheets

(56) References Cited

U.S. PATENT DOCUMENTS

| | | | | |
|---|---|---|---|---|
| 2004/0261167 | A1* | 12/2004 | Panopoulos | E04H 4/1694/490 |
| 2008/0039977 | A1* | 2/2008 | Clark | G05D 23/1905 700/282 |
| 2009/0132436 | A1 | 5/2009 | Pershing et al. | |
| 2010/0299016 | A1* | 11/2010 | Benzler | E04H 4/1654 701/26 |
| 2013/0061407 | A1* | 3/2013 | Ben-Dov | E04H 4/1636 901/1 |
| 2014/0015959 | A1 | 1/2014 | Durvasula et al. | |
| 2014/0132635 | A1 | 5/2014 | Murdoch et al. | |
| 2014/0166045 | A1* | 6/2014 | Herring | E04H 4/1654 134/1 |
| 2014/0280269 | A1 | 9/2014 | Schultz et al. | |
| 2015/0045058 | A1* | 2/2015 | Rudow | H04W 4/029 455/456.1 |
| 2015/0267433 | A1 | 9/2015 | Leonessa et al. | |
| 2017/0212484 | A1 | 7/2017 | Potucek et al. | |
| 2017/0212523 | A1 | 7/2017 | Witelson | |
| 2017/0277177 | A1 | 9/2017 | Witelson et al. | |
| 2018/0135325 | A1* | 5/2018 | Schloss | E04H 4/1654 |
| 2018/0174207 | A1 | 6/2018 | Potucek et al. | |
| 2018/0224822 | A1 | 8/2018 | Potucek et al. | |
| 2018/0240322 | A1 | 8/2018 | Potucek et al. | |

FOREIGN PATENT DOCUMENTS

| | | | | |
|---|---|---|---|---|
| CN | 109577697 | A * | 4/2019 | E04H 4/1654 |
| EP | 3199725 | | 8/2017 | |
| WO | 2014004929 | | 1/2014 | |

OTHER PUBLICATIONS

Occipital Hq, "Canvas: Create a 3D Model of Your Home in Minutes," (YouTube video), uploaded on Nov. 10, 2016 by user "Occipital Hq." Retrieved from Internet on Jun. 23, 2020: <https://www.youtube.com/watch?v=XA7FMoNAK9M> (Year: 2016).*
Mapletree Apps, "Apple ARKit iPhone Demo" (YouTube video), uploaded on Oct. 1, 2017, retrieved from Internet on Feb. 18, 2020: <https://www.youtube.com/watch?v=WvJLsk3Bafg> (Year: 2017).*
Galindo et al., "Swimming Pools Localization in Colour High-Resolution Satellite Images," Geoscience and Remote Sensing Symposium, 2009 IEEE International, Jul. 12, 2009, pp. IV-510-IV-513.
Rodriguez-Cuenca et al., "Semi-Automatic Detection of Swimming Pools from Aerial High-Resolution Images and LIDAR Data," Remote Sensing, vol. 6, No. 4, Apr. 25, 2014, pp. 2628-2646.
Unpublished U.S. Appl. No. 62/531,609, filed Jul. 12, 2017.
International Patent Application No. PCT/US2018/041730, filed Jul. 12, 2017, 18 pages.
International Patent Application No. PCT/US2018/041730, International Search Report, dated Oct. 18, 2018, 16 pages.
PCT/US2018/052575, "International Search Report and Written Opinion", dated Mar. 20, 2019, 19 pages.
PCT/US2018/052575, "Invitation to Pay Additional Fees and, Where Applicable, Protest Fee", dated Jan. 16, 2019, 12 pages.
International Application No. PCT/US2018/052575, International Preliminary Report on Patentability dated Apr. 16, 2020, 13 pages.
European Application No. 18789289.8, Office Action dated Oct. 21, 2022, 6 pages.
European Application No. 18789289.8, Office Action, dated Jun. 11, 2021, 6 pages.
Australian Application No. 2018345417, First Examination Report dated Sep. 23, 2023, 3 pages.
AU2018345417, Notice of Acceptance, Apr. 3, 2024, 3 pages.

* cited by examiner

Splash Screen

Select Pool Shape

Box Placement

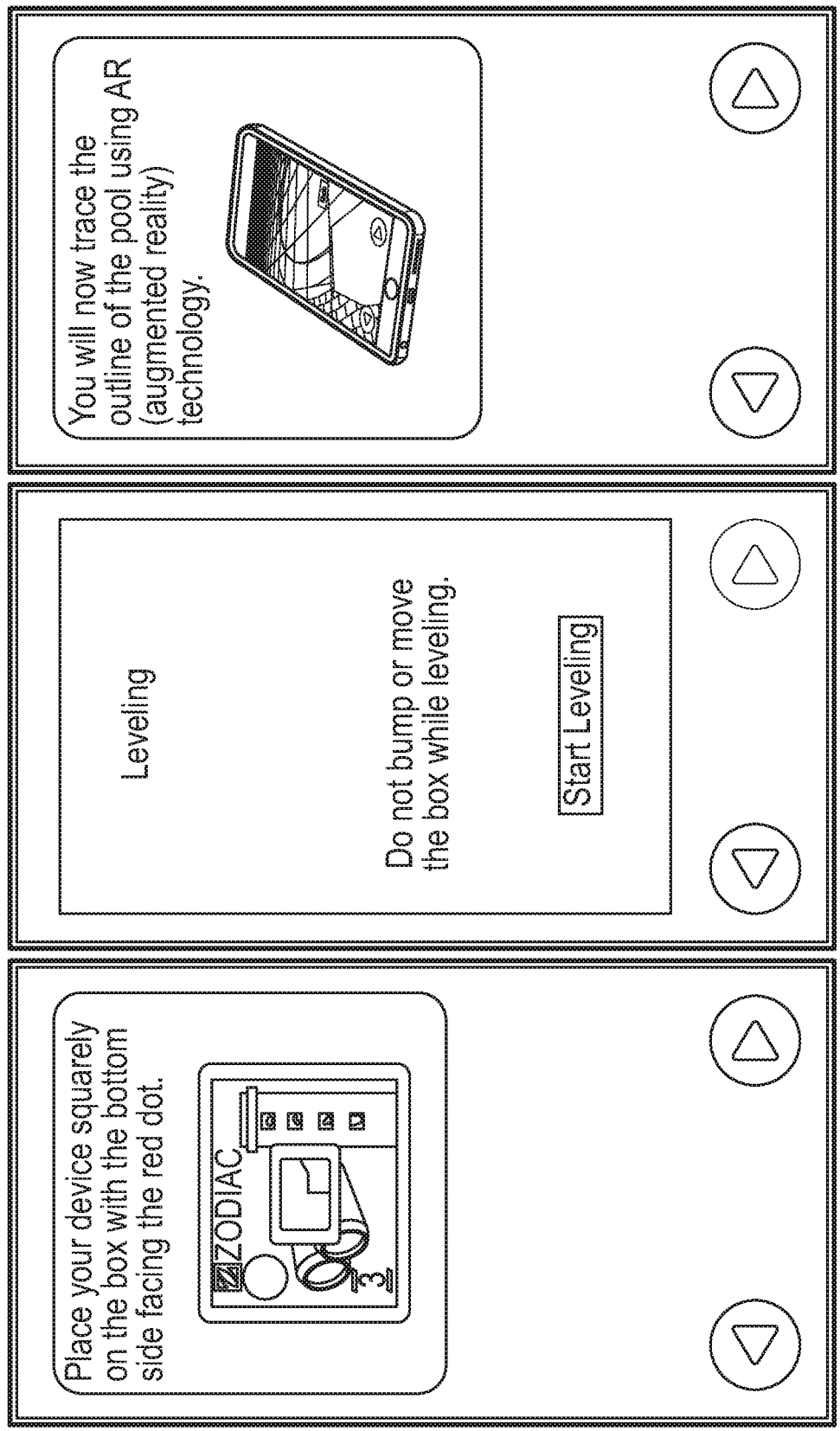

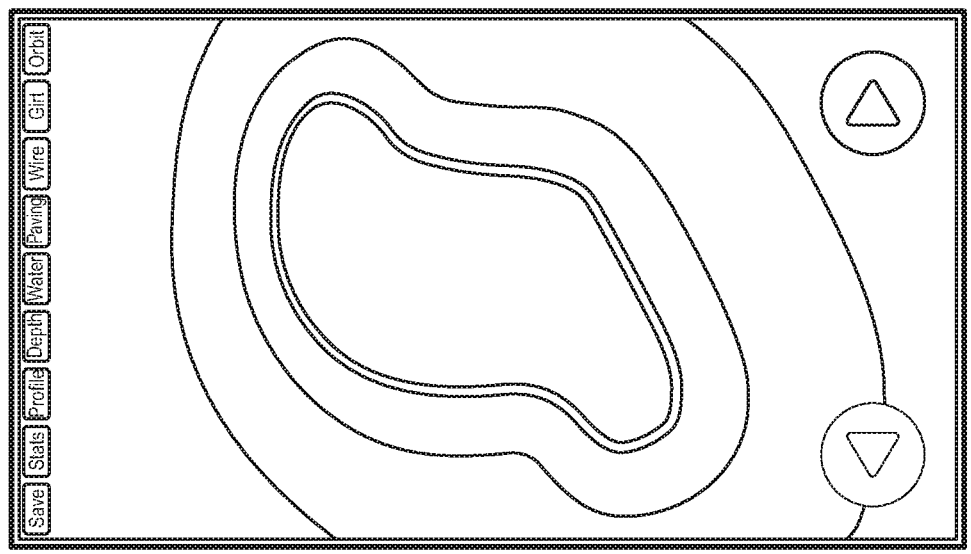
FIG. 9 Create 3D Pool
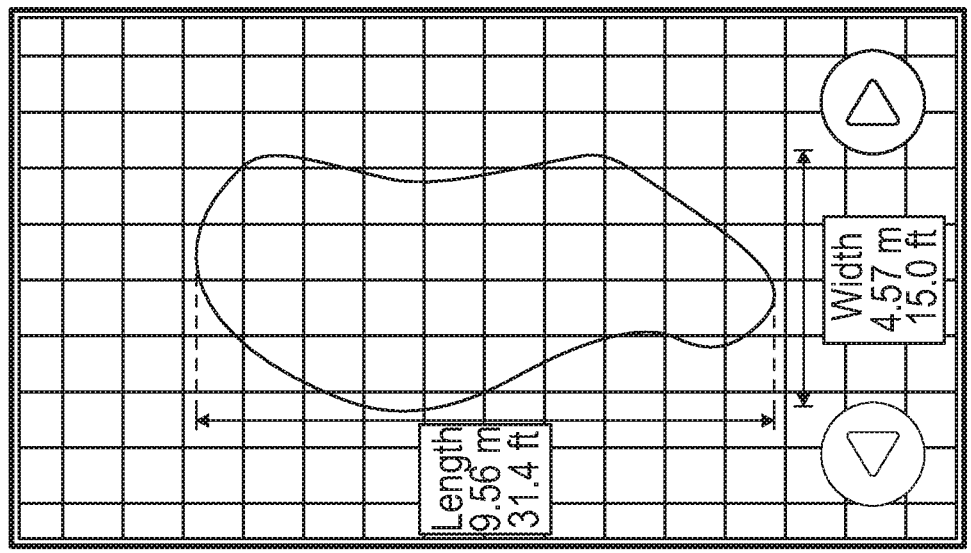
FIG. 8 Show Outline and Dimensions
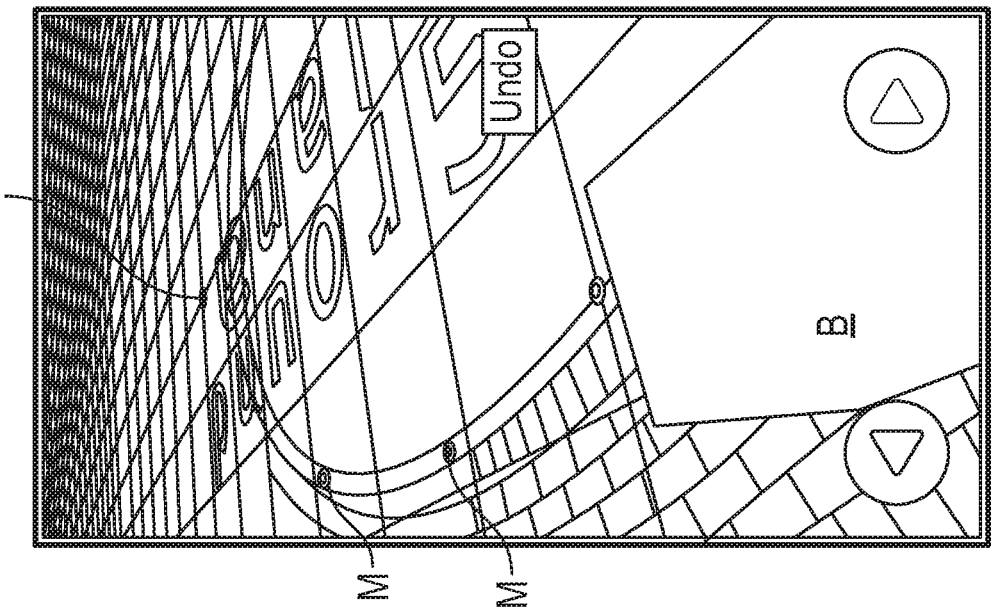
FIG. 7 AR Place Markers Adjust Pool Depth Change Pool Profile to update 3d Pool Picture to Illustrate Depth Profile Conformance Provide Pool Info Upload Pool Parameters to Pool Cleaner

DETERMINING CHARACTERISTICS OF LIQUID-CONTAINING VESSELS SUCH AS SWIMMING POOLS AND SPAS AND USING SUCH CHARACTERISTICS IN OPERATION OF THE VESSELS

CROSS-REFERENCE TO RELATED APPLICATIONS

This application claims the benefit of and priority to (1) U.S. Provisional Patent Application Ser. No. 62/693,565, filed Jul. 3, 2018, and having the same title as appears above, and (2) U.S. Provisional Patent Application Ser. No. 62/568,045, filed Oct. 4, 2017, and entitled "Methods of Mapping/Measuring Dimensions of Swimming Pools and Spas," the entire contents of both of which applications are hereby incorporated herein by this reference.

FIELD OF THE INVENTION

The present invention relates to systems and methods for determining characteristics of liquid-containing vessels and more particularly, although not necessarily exclusively, to systems and methods for using augmented reality techniques to map shapes of swimming pools and spas, determining other characteristics (e.g. volumes) of the pools and spas, and utilizing the determined information in operation of the pools and spas.

BACKGROUND OF THE INVENTION

Swimming pools and spas are constructed in multiple shapes and sizes. Although some pools are generally rectilinear in shape and of generally constant depth, many others have complex shapes with non-uniform lengths, widths, and depths. These complex shapes complicate determination of various characteristics of the pools: As a simple example, even determining volumes of these pools may be difficult.

Nevertheless, obtaining additional information about swimming pools and spas often will be useful in operating the vessels. For example, localized mapping of the length, width, and depth of a pool may provide beneficial information to an automatic swimming pool cleaner (APC) operating therein. Knowing the volume of the pool, as another example, may be valuable in calculating an amount of chlorine (or other chemical) to add to the water of the pool to improve its quality or cleanliness.

Automated systems for discerning at least some information relating to pools have been proposed. Such systems contemplate using an operating, in-pool automatic pool cleaner with on-board processor and memory (commonly called a "pool robot") to travel within a pool and gather information about the pool based on its travels. U.S. Patent Application Publication No. 2015/0267433 of Leonessa, et al., for example, discloses a pool robot having on-board laser range finders or other sensor assemblies to "map[ ] a swimming pool or spa environment." See Leonessa, p. 2, ¶0027.

Also proposed is usage of cameras to capture movement of pool robots operating within pools. U.S. Patent Application Publication No. 2014/0015959 of Durvasula, et al., discloses a camera system configured to capture movement of a robotic cleaner within a pool. See Durvasula, p. 1, ¶0017. Together with an external controller, the camera system identifies areas of the pool not traversed by the robotic cleaner and, in real-time, electronically steers the robot to cover such missed areas. See id., p. 2, ¶0022-0023. Uncleaned areas may also be displayed (in unspecified manner) to allow persons to estimate how much more time must elapse before all areas are cleaned. See id., ¶0027. Although cameras detailed in the Durvasula application may be positioned externally of a pool (i.e. not submerged within the pool), systems of the Durvasula application do not contemplate mapping, e.g., sizes and shapes of pools. Indeed, to the extent graphical depiction of pool information appears in the displays, the information evidently is pre-loaded in the controller. See id., p. 4, ¶0040-0043.

Commonly-owned International Patent Application No. PCT/US2018/041730 of McQueen discusses systems and methods of mapping characteristics (including sizes and shapes) of swimming pools and spas. Preferred methods use satellite-based imagery as, for example, provided by Google Earth. Often pools are visible in the publicly-available satellite images, which thus provide "bird's eye" views of the pools. Shapes of the pools, at least at their upper surfaces, can be discerned from viewing the bird's eye images.

SUMMARY OF THE INVENTION

The present invention employs augmented reality techniques to assist in determining characteristics of swimming pools and spas. Using an image-capture device such as (but not limited to) a smartphone or tablet, someone may virtually trace an outline of a pool. A reference size and shape may be supplied to scale the outline appropriately. Additional depth-related and other information may be provided, allowing creation of a three-dimensional mapping of the general size and shape of the pool. The mapped and provided information may be available for display (on the same device used to capture the images or otherwise) if desired; it further may be furnished to an APC to improve its operational efficiency in cleaning the pool. Other uses of the mapped and provided information may be made as well. As one of many such examples of these other uses, operation of any appropriately-configured equipment of a water-circulation system of a pool or spa may change depending on the obtained information.

In some versions of the invention, the conventional smartphone or tablet, etc., may have loaded into it computer software emulating a tangible measuring device such as a tape measure or ruler. For example, a software application ("app") entitled "AR Measure" available from Laan Labs may be loaded onto an iPhone and supply a VR tape measure. A pool owner (or service technician, contractor, or other interested party) thereafter may use the AR Measure app to determine information about the pool, either by walking the perimeter of the pool with the iPhone in hand or directing a camera of the iPhone about the perimeter, as examples. Discontinuities of pool shape may be marked or otherwise noted (either "manually" by the user or "automatically" by the app), as may be other points of interest. Sizes, shapes, and other features of pools thus may be determined using the app, which determinations may be stored in memory, displayed, transferred or transmitted elsewhere, or otherwise processed as appropriate or desired.

It thus is an optional, non-exclusive object of the present invention to provide systems and methods for determining characteristics of liquid-containing vessels.

It is another optional, non-exclusive object of the present invention to provide systems and methods for using augmented reality techniques to map shapes of swimming pools and spas.

It is also an optional, non-exclusive object of the present invention to provide systems and methods for determining other characteristics (e.g. volumes) of the pools and spas, and utilizing the determined information in operation of the pools and spas.

It is, moreover, an optional, non-exclusive object of the present invention to provide systems and methods for determining information about pools and spas that may be furnished to APCs for operation in pools or spas.

Other objects, features, and advantages of the present invention will be apparent to persons skilled in the relevant art with reference to the remaining text and the drawings of this application.

BRIEF DESCRIPTION OF THE DRAWINGS

FIG. 4 is an exemplary screen shot of the app of FIG. 1 instructing device placement on the box.

FIG. 5 is an exemplary screen shot of the app of FIG. 1 requesting commencement of a levelling determination.

FIG. 6 is an exemplary screen shot of the app of FIG. 1 instructing commencement of tracing an outline of the pool.

FIG. 7 is an exemplary screen shot of the app of FIG. 1 in which virtual markers have been placed along the upper edge of the pool.

FIG. 8 is an exemplary screen shot of the app of FIG. 1 displaying a virtual outline of the pool.

FIG. 9 is an exemplary screen shot of the app of FIG. 1 displaying a virtual assumptive three-dimensional outline of the pool.

DETAILED DESCRIPTION

Figure 1:
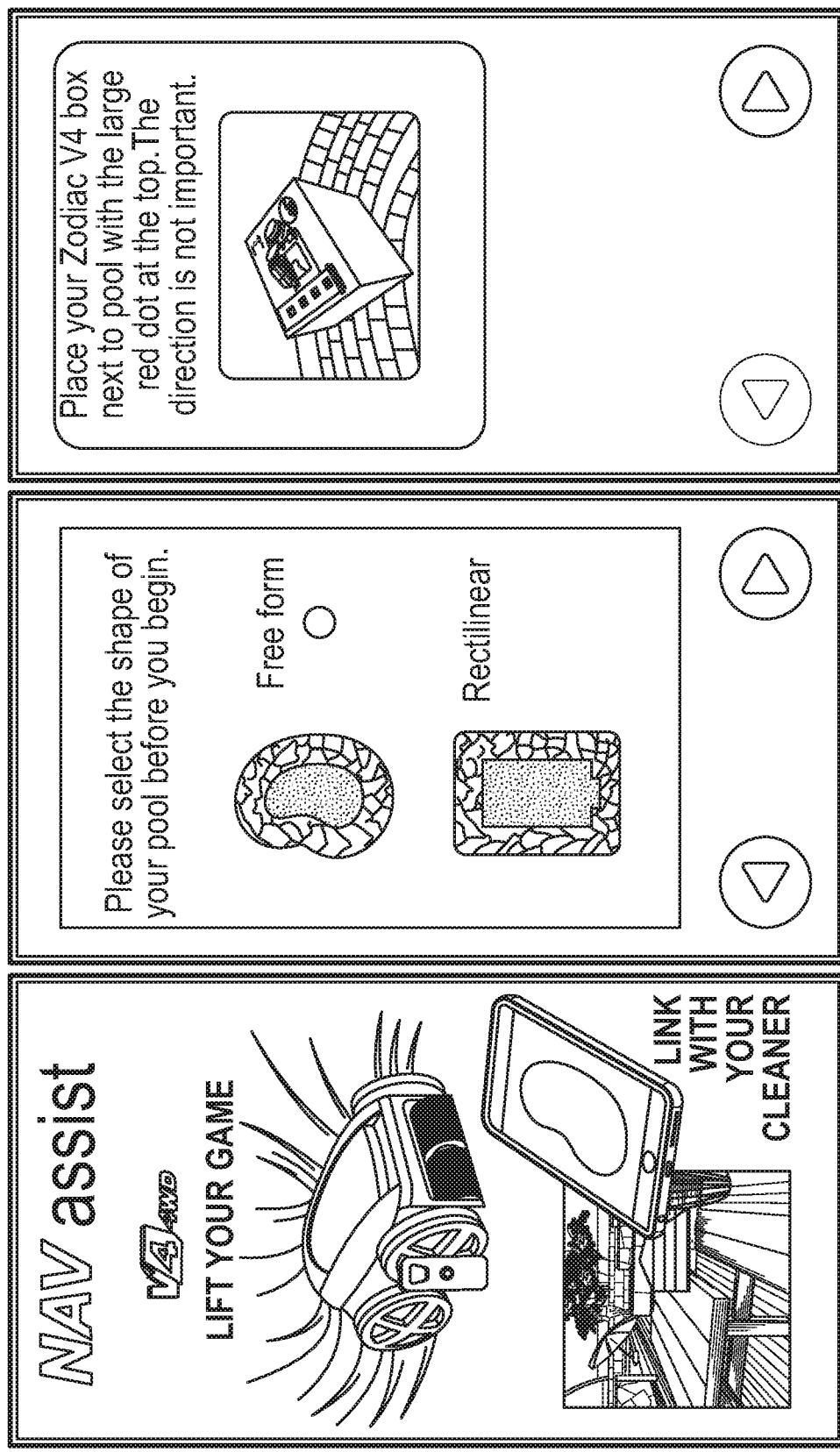
FIG. 1 is an exemplary screen shot of a starting, or "splash" screen of one type of app useful in connection with the present invention.
Figure 2:
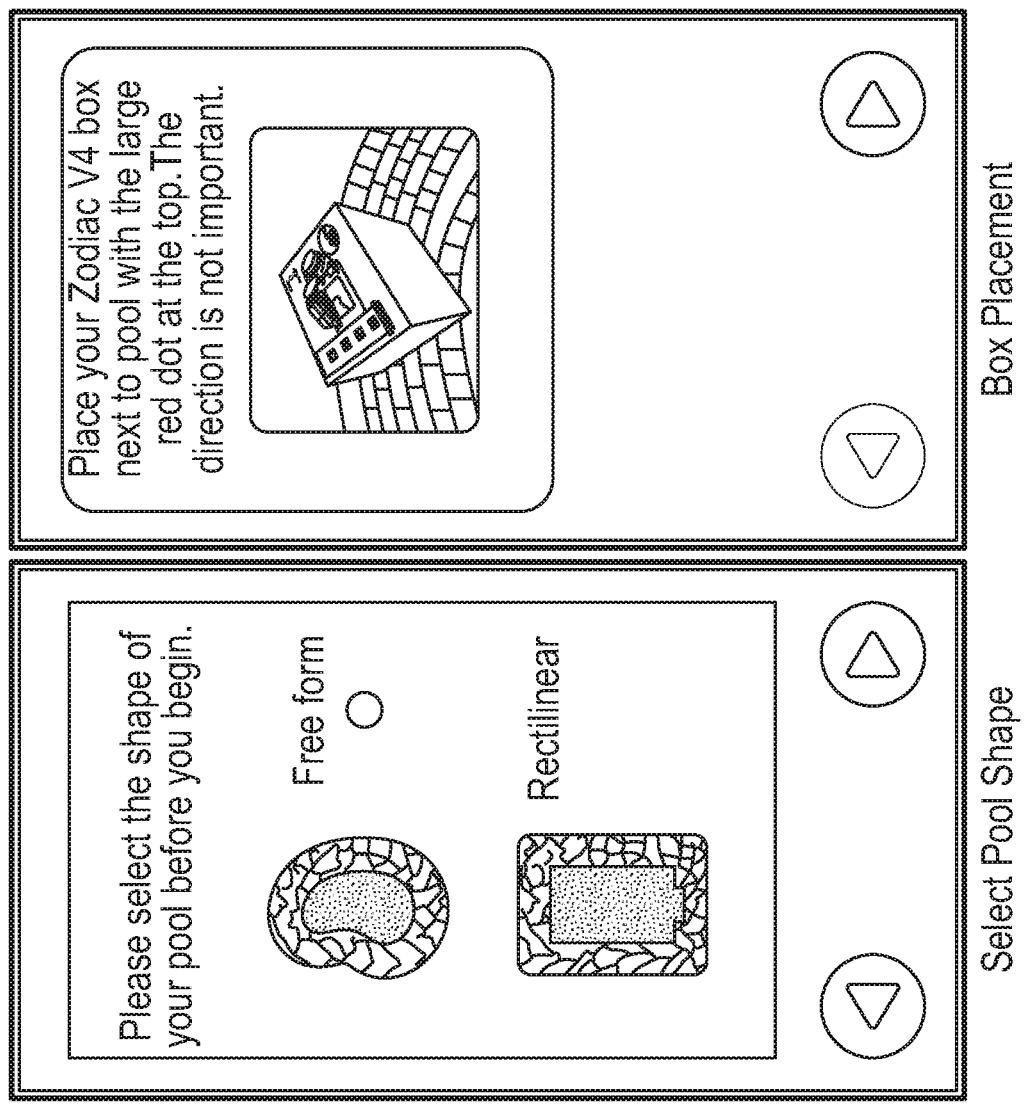
FIG. 2 is an exemplary screen shot of the app of FIG. 1 requesting selection of a pool shape.

In at least one version of the invention, a person may interact with a software program ("app") resident on, e.g., a mobile electronic device. An exemplary version of the app is entitled "NAV assist," as shown in FIG. 1. The app initially may request information about the general shape of the pool of interest, asking the person or user to select whether the pool is free-form or rectilinear in shape (FIG. 2).

Figure 3:
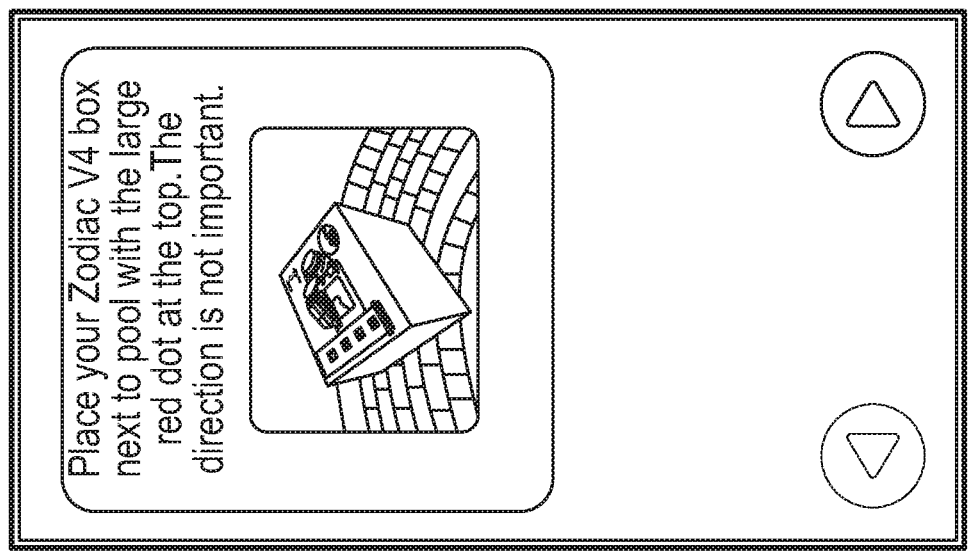
FIG. 3 is an exemplary screen shot of the app of FIG. 1 instructing placement of a box adjacent the pool.

This version of the app contemplates that a "Zodiac V4" robotic APC will be deployed in the pool. As illustrated in FIG. 3, the app requests that the person place the box B (see also FIG. 7) for the Zodiac V4 APC next to the pool, with the side of box B containing a large red dot facing upward. Because the size and shape of box B are known, box B may readily function as a reference object for purposes of scale. Of course, persons skilled in the art will recognize that other objects of known size may be utilized instead of this box B, and other methods of providing reference information, may be used. As well, in some instances no distinct reference object need be used as, for example, when apps utilizing Apple's ARKit software tools are available.

Assessing whether the Zodiac V4 box (or other reference object) is level relative to the ground (Earth) also supplies useful information to the app. Accordingly, FIG. 4 depicts the app requesting the person to place the image-capture device on the upper face of box B with the back or bottom side of the device facing the red dot. The person thereafter may interact with the app to commence a "level" determination (FIG. 5); such determination typically utilizes existing hardware (e.g. accelerometer, compass) within the device to evaluate its orientation relative to the ground. To the extent that box B is not level, in-app corrections may be made.

FIG. 6 depicts the app displaying to the person an instruction to commence tracing an outline of the pool. Using the image-capture function of the device, the person places virtual markers M along the upper edge of the pool. In at least one version of the app, a cursor C may provide "cross-hairs" on the images viewed on the device; when the person aligns the cross-hairs of cursor C with a point of the viewed image along the upper edge of the pool, the person may "click" on the device so as to capture the point as part of the outline of the pool and virtually mark it with a marker M. Such capturing efforts typically require box B to be present in the picture (as shown, for example, in FIG. 7) to serve as a real-world reference for the ground plane, although conceivably the reference information supplied by box B could be translated to some other object if necessary or desired.

The person proceeds to move the device so as to capture additional points of the outline of the pool and virtually mark them with markers M. FIG. 7, for example, shows four markers M, with cursor C moved in preparation for marking a fifth point of the outline. Spacing of markers M is not critical, although creating more markers M may produce more precise outlines than creating fewer markers M.

Figure 10:
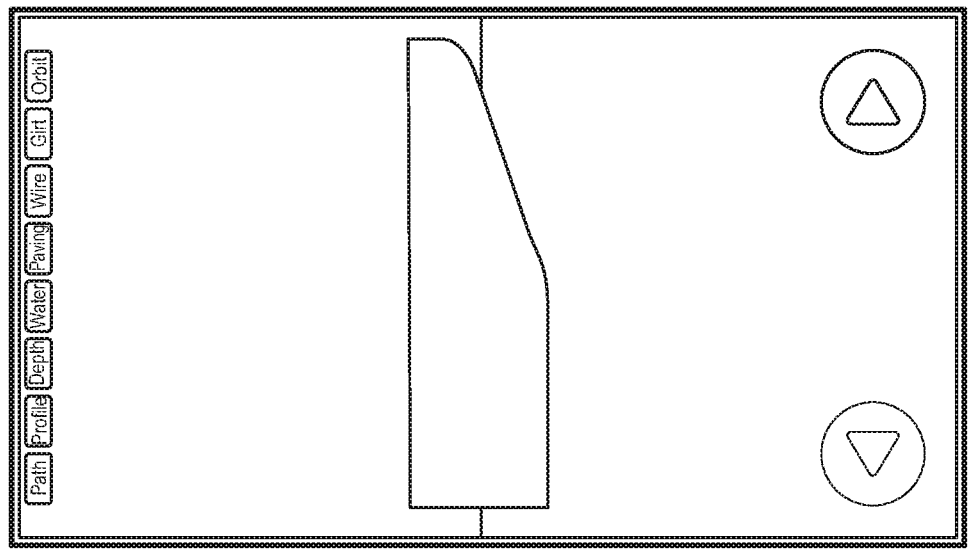
FIG. 10 is an exemplary screen shot of the app of FIG. 1 requesting provision of an approximate depth of the pool.

Once markers M exist around the entirety of the pool, the app may create and display a virtual outline of the pool as shown in FIG. 8. Also as shown in FIG. 8, a maximum length and width of the outlined pool may be calculated and displayed. Further, by assuming certain depth-related information about the pool, the app may render and display a three-dimensional assumptive view of the pool as shown in FIGS. 9-10.

Figure 11:
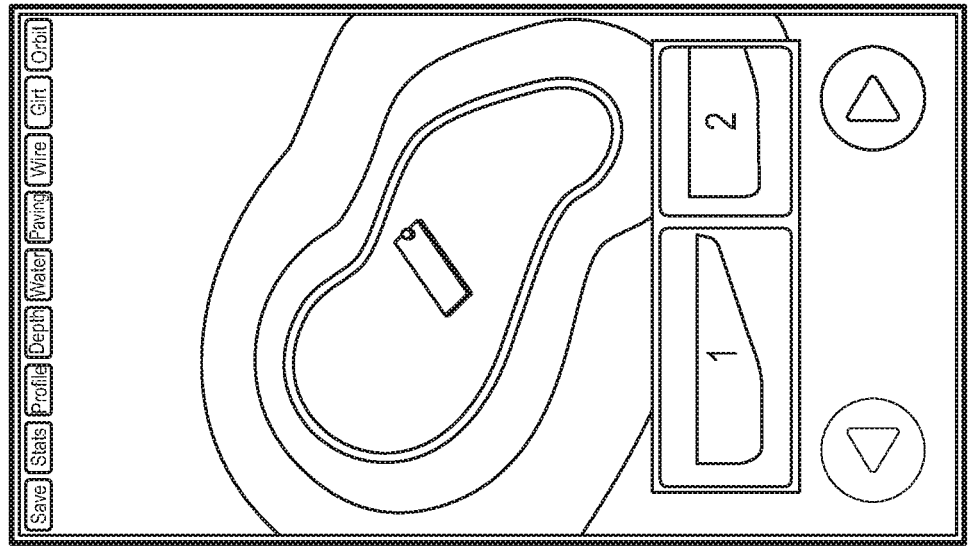
FIG. 11 is an exemplary screen shot of the app of FIG. 1 requesting selection of a depth profile of the pool.
Figure 12:
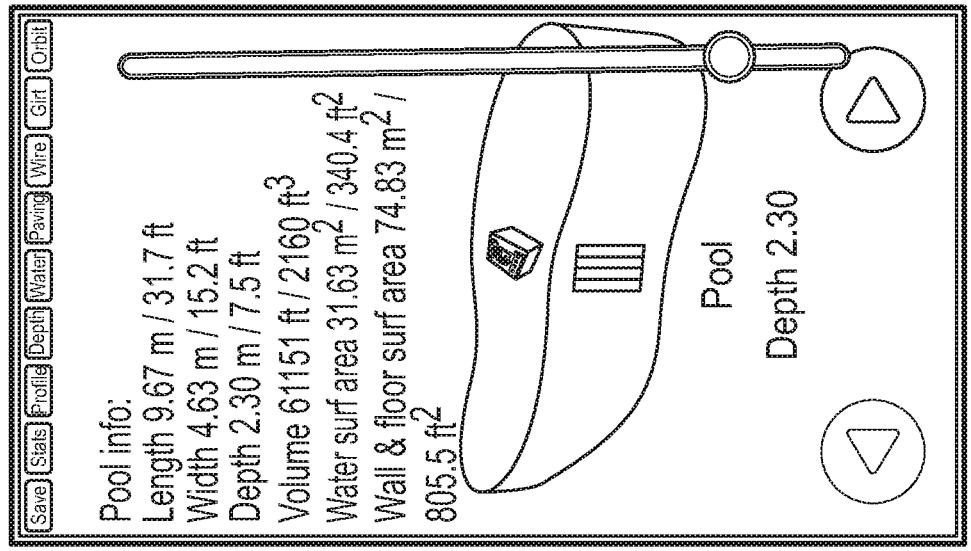
FIG. 12 is an exemplary screen shot of the app of FIG. 1 displaying an elevational rendering of the pool for confirmation.

Because depth of a pool is difficult to ascertain (due in part to light refraction properties of water), versions of the present app request that the person interactively supply some of this information. In FIG. 10, for example, a person is requested to provide an approximate maximum depth of the pool, while in FIG. 11, the person is requested to select one of several possible depth profiles for the pool. After the information is provided and the selection is made, the app may then display an elevational rendering of the pool for confirmation, as shown in FIG. 12. Additionally illustrated in FIG. 10 are various characteristics (e.g., length, width, depth, volume, water surface area, wall and floor surface area) of the pool whose values are obtained or calculated by the app. Further envisioned by the version of the app shown in FIG. 10 is display of some of these values, which may change as the person changes the pool depth (as by adjusting the virtual slider of the figure).

Figure 13:
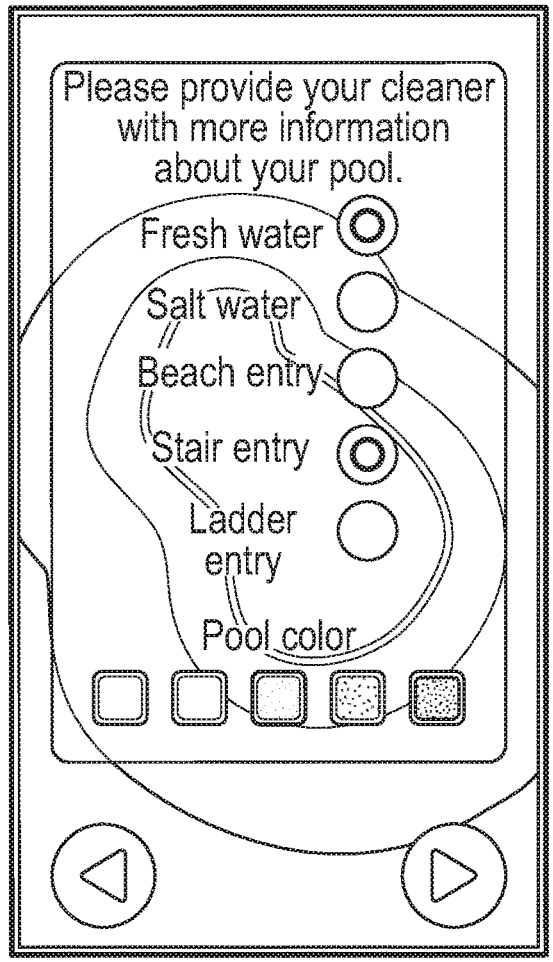
FIG. 13 is an exemplary screen shot of the app of FIG. 1 requesting provision of additional information concerning the pool.

Versions of the app also contemplate optionally receiving additional information about the pool of interest. FIG. 13, for example, requests that the person identify whether fresh or salt water is present in the pool, whether pool entry is made by stairs, a ladder, or a beach, and the color of the pool surfaces. Additional or alternative information may be obtained as desired.

Figure 14:
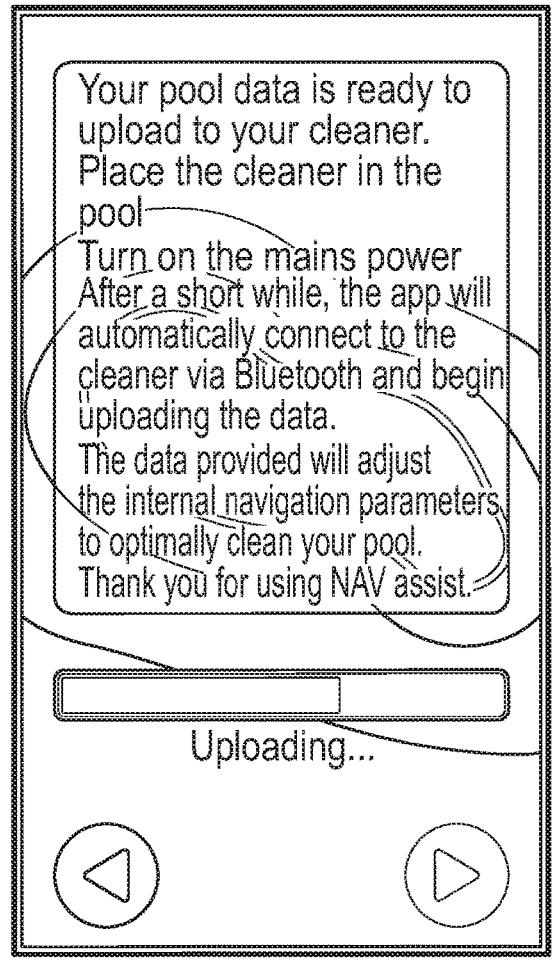
FIG. 14 is an exemplary screen shot of the app of FIG. 1 instructing placement of an APC into the pool.

Thereafter, some or all of the information available to or created by the app may be supplied to an APC in an effort to improve its performance. Consistent with FIG. 14, the app may instruct the person to place the APC in the pool and provide power to the APC. The app and the APC may then communicate in any appropriate way; presently preferred is that such communication occur wirelessly, as through Bluetooth technology, although other communication techniques may be used instead. Data provided to the APC may be used to adjust its internal navigation parameters to improve cleaning of the pool. Of course, these data may be supplied to other equipment as well: The calculated volume of the pool may be supplied to an automatic chlorinator, for example, for determination of how much chlorine to release to the pool.

Numerous variations of the app may be made within the scope of the invention. As one of many examples, size calculations of the pool possibly may be improved by having the user mark, or confirm an automatic marking of, a rendering of the pool with a "spine"—a curve or line approximately bisecting the width of the pool along its length. Renderings also may include features of the pool (e.g. stairs, ladders, drains, fittings, etc.), and the app may upload information concerning the pool to others such as pool service technicians, pool equipment manufacturers, etc.

Yet additionally, the app may receive information about the pool from the APC or remote sources. As the APC navigates the pool, it may be able to glean information such as depth and curvature and transmit the information to the app. The app also may determine orientation of the pool relative to magnetic North. This determination, when provided to an APC equipped with a magnetometer, for example, may assist the APC in obtaining its relative position within the pool. Any or all of these data, whether sensed by or supplied to the APC, may aid in creating an efficient cleaning cycle for a pool.

Moreover, at least some newer image-capture devices may be configured so as not to need reference box B in order to determine a ground plane and sizing. A user may continue to create markers M about the pool, but need not necessarily maintain box B in the camera view. Furthermore, information obtained by any or all of the person, APC, and app may be useful to pool service and development teams, for example, and others involved in research, development, maintenance, repair, etc., of pools and associated equipment. The information may be transferred to these people in any appropriate manners, including (but not limited to) through the Internet.

Exemplary concepts or combinations of features of the invention may include:
A. A method of mapping a pool by capturing images of the pool and a reference object.
B. A method of forming an outline of a pool comprising (i) marking points along an edge of the pool virtually using an image-capture device and (ii) supplying information relating to a depth of the pool.
C. A method of cleaning a pool comprising: (i) mapping the pool by capturing images of the pool and a reference object; and (ii) communicating information relating to the pool mapping to an automatic swimming pool cleaner configured for use in the pool.
D. A cleaning system comprising: (i) a reference object of known size and shape; (ii) a device configured to (a) capture images, (b) display a rendering of a pool created using augmented reality and the captured images, and (c) communicate wirelessly; and (iii) an automatic swimming pool cleaner configured to communicate wirelessly with the device.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

Further, although applicant has described devices and techniques for use principally with swimming pools, persons skilled in the relevant field will recognize that the present invention may be employed in connection with other objects and in other manners. Additionally, a VR tape measure—such as that of the app entitled "AR Measure" noted above—may be used in connection with the tracing described in FIGS. 6-7. Finally, references to "pools" and "swimming pools" herein may also refer to spas or other water containing vessels used for recreation or therapy and for which mapping is needed or desired. The entire contents of all of the Leonessa, Durvasula, and McQueen applications are incorporated herein by this reference.

What is claimed is:
1. A method of cleaning a swimming pool comprising:
a. receiving an input of a selection of a pool shape from a mobile device;
b. receiving a plurality of images of the swimming pool from the mobile device, wherein a view of the swimming pool of at least one image of the plurality of images is different from a view of the swimming pool of another image of the plurality of images;
c. modelling the swimming pool by determining a 3D model of the swimming pool based on the selection of the pool shape and the plurality of images from the mobile device;
d. receiving, from an automatic swimming pool cleaner, cleaning cycle information about a cleaning cycle performed by the automatic swimming pool cleaner within the pool; and
e. generating a modified cleaning cycle based on the 3D model and the cleaning cycle information from the automatic swimming pool cleaner, wherein generating the modified cleaning cycle comprises adjusting navigation of the automatic swimming pool cleaner within the swimming pool.

2. The method of claim 1, further comprising receiving water characteristic information from the mobile device, wherein the water characteristic information comprises a type of water in the swimming pool, and wherein causing the mobile device to communicate to the automatic swimming pool cleaner further comprises causing the mobile device to communicate the water characteristic information.

3. The method of claim 1, further comprising receiving pool surface color information from the mobile device, and wherein causing the mobile device to communicate to the automatic swimming pool cleaner further comprises causing the mobile device to communicate the received pool surface color information.

4. The method of claim 1, wherein modelling the pool further comprises creating and displaying a virtual outline of the pool by:
- identifying a plurality of markers in the plurality of images, each marker of the plurality of markers spaced apart from at least one adjacent marker;
- creating the virtual outline based on the identification of the plurality of markers; and
- displaying the virtual outline of the pool.

5. The method of claim 4, wherein displaying the virtual outline of the pool comprises displaying the virtual outline of the pool with a view different from views of the pool from the plurality of images.

6. A method of cleaning a swimming pool having a perimeter, the method comprising:
- a. determining a virtual representation of the swimming pool by:
  - receiving an input of a selection of a pool shape from a mobile device;
  - receiving a plurality of images of the swimming pool from the mobile device, wherein a view of the swimming pool of at least one image of the plurality of images of the swimming pool is different from a view of the swimming pool of another image of the plurality of images, and
  - modelling the swimming pool by determining a 3D model of the swimming pool based on the pool shape and the plurality of images received from the mobile device;
- b. causing the mobile device to display the 3D model of the virtual representation of at least a part of the swimming pool;
- c. receiving, from an automatic swimming pool cleaner, information about a cleaning cycle performed within the pool; and
- d. generating a modified cleaning cycle for the automatic swimming pool cleaner in the swimming pool based on the virtual representation of the pool and the information about the cleaning cycle,
  - wherein generating the modified cleaning cycle comprises adjusting navigation of the automatic swimming pool cleaner.

7. The method according to claim 6, further comprising determining an amount of chlorine to release to the pool based on the 3D model.

8. The method according to claim 6 in which the virtual representation includes at least one feature of the swimming pool selected from the group consisting of stairs, ladders, drains, and fittings.

9. The method of claim 6, further comprising receiving information relating to an orientation of the pool relative to magnetic north, and wherein generating the modified cleaning cycle is based on the information relating to the orientation of the pool relative to magnetic north.

* * * * *